May 17, 1966     A. L. CROSS     3,251,957
GRAVITY OPERATED ALARM SWITCH FOR MOTOR VEHICLES
Filed Feb. 18, 1964
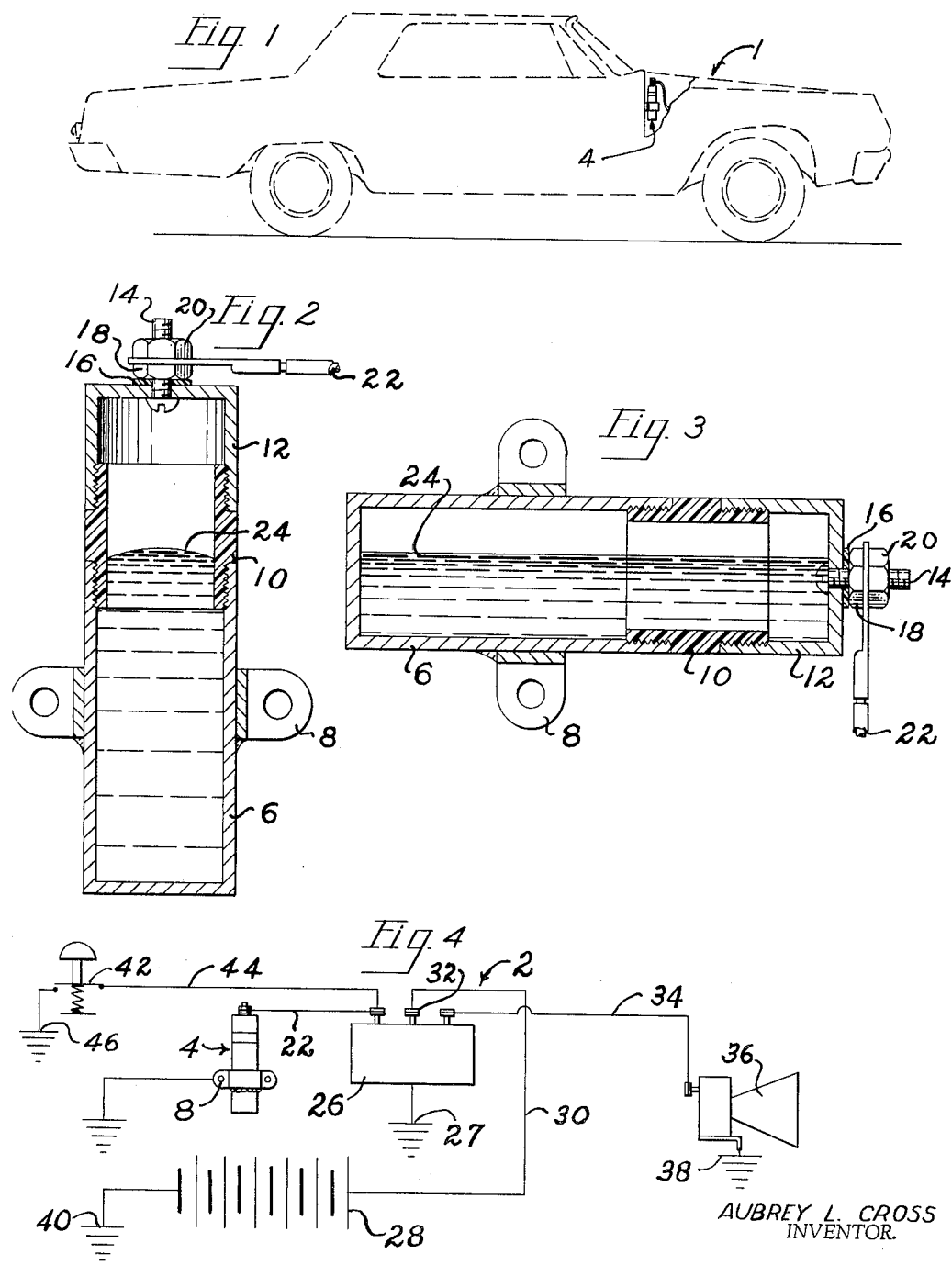
AUBREY L. CROSS
INVENTOR.
BY
*Wayland D. Keith*
HIS AGENT

United States Patent Office 3,251,957
Patented May 17, 1966

3,251,957
GRAVITY OPERATED ALARM SWITCH FOR MOTOR VEHICLES
Aubrey L. Cross, P.O. Box 300, Wichita Falls, Tex.
Filed Feb. 18, 1964, Ser. No. 345,669
4 Claims. (Cl. 200—61.47)

This invention relates to improvements in alarm switches, and more particularly to alarm switches for use on vehicles to give an alarm or warning, should the vehicle be capsized in some remote place, or out of normal sight.

Various alarm switches for this purpose have been proposed heretofore, but these, for the most part, were complex in structure, expensive to manufacture and to install.

The present alarm switch is so designed as to efficiently and effectively close a circuit, when a vehicle is tilted beyond a certain degree or when it is overturned, which switch, when connected in parallel with a horn button or the like of the vehicle, to a horn relay, or directly to the horn, will sound a distress signal, such as sounding the horn to lead those seeking the car to the car, or which will direct passers-by to seek out the source of the alarm.

An object of this invention is to provide an alarm switch which is actuated by gravity to close a circuit when a car or other vehicle is tipped beyond a predetermined degree or when the vehicle is overturned.

Another object of the invention is to provide an alarm switch which is gravity operated, and which switch may be readily installed on a car so as to perform dually with a horn button switch or other switch.

Still another object of this invention is to provide a switch having a metallic substance therein, such as mercury, or other flowable metallic substance which will enable a circuit to be closed when a car or other vehicle is tipped beyond a certain degree, or when the vehicle is overturned.

Yet another object of the invention is to provide a gravity operated switch, having mercury or the like therein, which is simple in construction, inexpensive to manufacture, and easy to install.

With these objects in mind and others which will become manifest as the description proceeds, reference is to be had to the accompanying drawings, in which like reference characters designate like parts in the several views thereof, in which:

FIG. 1 is a side elevational view of an automotive vehicle, as shown in dashed outline, and showing portions of the vehicle broken away to show the safety alarm switch installed thereon;

FIG. 2 is a longitudinal sectional view through the safety alarm switch, with portions thereof being shown in elevation, and showing the switch in non-contact position;

FIG. 3 is a view similar to FIG. 1, but with the switch tilted through ninety degrees, and showing the switch in contact position; and FIG. 4 is a diagrammatic view of the wiring system, showing the switch in elevation, as installed therein.

With more detailed reference to the drawing, the numeral 1 designates generally a motor vehicle having an electrical system thereon, which is generally designated by the numeral 2. A safety alarm switch is indicated generally by the numeral 4.

The alarm switch comprises a cylindrical, cup-like, hollow metallic cap or member 6 to which a base 8, which form an electrical connection is secured, as by clamping, soldering, or the like. The cap or member 6 is screw-threaded to receive a screw-threaded tubular insulation bushing 10 therein, which bushing is made of fiber, plastic, hard rubber, or other type of insulating material, which tubular insulation bushing has each end portion thereof of reduced diameter with respect to the annular boss intermediate portion thereof, with the end portions each having a reduced wall thickness, as shown in FIGS. 2 and 3. The upper end of the bushing 10 is also screw-threaded to complementally engage a screw-threaded closed, cylindrical, metallic cap or member 12. The cap or member 12 is apertured to receive a terminal screw 14 therethrough. A sealing member, such as the washer 16, is interposed between the end of the cap or member 12 and a nut 18 which is threaded onto screw 14. A further nut 20 bindingly engages an electrical conductor 22 to screw 14. The cylindrical, tubular cap or member 6 is filled more than one-half full with a flowable, metallic conductor material 24, which material may be mercury, or other flowable electrical conductor substance, which material is so positioned within the tubular cap or member 6 as to be out of normal contact with cap or member 12, when the switch is in upright position, as shown in FIGS. 1, 2 and 4.

When the alarm switch is tipped from the upright position, as shown in FIGS. 1, 2 and 4, to the position as shown in FIGS. 3 and 5, or, if the switch is inverted, the metallic electrical conductor material 24 will flow across insulating bushing 10 to form a contact between the tubular cap or member 6 and the closed metallic cap or member 12, whereupon, with the base 8 grounded, as shown in FIG. 4, and with the electrical conductor 22 connected between the switch 4 and a relay 26, the relay will be energized to close a circuit from the battery 28 of the vehicle through conductor cable 30 to the terminal 32 of the relay, whereupon, with the contact points of the relay closed, the electrical current will pass through conductor cable 30, relay 26, to conductor 34 leading to horn 36, and through the ground 38 to the ground 40 to complete a circuit, which will initiate an alarm signal.

It is preferable that the alarm switch 4 be in parallel electrical connection with a horn switch 42 of the vehicle, which switch 42 will also close a circuit through the conductor 44 to the relay 26, with the conductor 44 being grounded by the closing of horn switch 42. The relay 26 may be of the grounded type and have a ground 27 to create the proper functioning of the system, as is well understood in the art of relays.

It is to be pointed out that the present invention may be used to give motorists the maximum protection at a minimum cost. While mercury switches are well known in the electrical art, it is to be pointed out that the present switch may be made with a minimum number of parts, that it does not require a glass envelope in which to seal the switch elements, as has been the custom heretofore in the use of mercury switches.

It is preferable to have the hollow portion of the cap or member 6 more than one-half of the length of the entire hollow portion of the switch 4. In this manner, when the switch is completely inverted, with the terminal post 4 extending downwardly, the flowable, metallic material 24, such as mercury, will fill the cap or member 12 and bushing 10 and be in electrical contact relation with the cap or member 6 so as to form a circuit therethrough.

It is preferable that the dimension mediate the length of bushing 10 to the bottom of the hollow portion of the cap or member 6 be about two-thirds the entire length of the hollow portion of the switch, and that the length of the bushing be such, from the end thereof adjacent the closed end of the body 6, be more than one-half the length of the hollow portion of the switch 4. In this manner, with the hollow portion of the switch more than half filled with mercury, or other flowable, elecrtical conductor material, the switch will be closed, either when tipped to the position, as shown in FIG. 3, or when the switch is in inverted relation with respect to FIG. 2.

While the invention has been shown and described, in some detail in one embodiment thereof, it is to be understood that changes may be made in the minor details of construction and adaptations made to different installations, without departing from the spirit of the invention or the scope of the appended claims.

Having thus clearly shown and described the invention what is claimed as new and desired to be secured by Letters Patent is:

1. In an article of manufacture, an alarm switch to indicate an angular tilt to a vehicle, which switch comprises;
   (a) a first hollow, metal member having one end thereof at least partially closed, which hollow, metal member forms a first switch contact,
   (b) a second hollow, metal member having one end thereof closed, which second hollow, metal member forms a second switch contact,
   (c) a tubular insulation bushing having end portions of reduced wall thickness and an intermediate portion forming an annular boss,
      (1) said hollow, metal members adapted to complementally engage opposed ends of said tubular insulation bushing with the ends of the respective metal members abutting with said annular boss of said tubular insulation bushing so as to form a substantially fluid tight seal therewith to form a chamber within said metal members and said tubular bushing,
      (2) a flowable, metallic, electric conductor substance within said chamber and adapted to be out of contact relation with at least one of said metal members when in one position and to make contact with both said metal members when in another position, and
   (d) electrical conductor connections associated with each said hollow, metal member.

2. An article of manufacture as defined in claim 1; wherein
   (a) each said hollow, metal member, which engages an end of said tubular insulation bushing, is screw threaded, and
   (b) said tubular insulation bushing being screw threaded on each end to complementally engage the screw threaded portion of the respective metal members.

3. In an article of manufacture, an alarm switch to indicate an angular tilt to a vehicle, which switch comprises;
   (a) a first apertured, hollow metal cap forming a first switch contact,
      (1) a terminal screw fitted within said aperture in fluid tight relation, which screw forms an electrical connection,
   (b) a second, non-apertured, hollow, metal cap forming a second switch contact,
      (1) said second metal cap having an electrical connection associated therewith,
   (c) a tubular insulation bushing having the end portions thereof of reduced diameter and the intermediate portion thereof forming an outwardly extending annular boss,
      (1) said end portions of said tubular insulation bushing each being of a size to complementally receive one of said hollow metal caps in fluid tight relation thereon to abut with said annular boss portion to form a chamber therein, and
   (d) a flowable, metallic, electrical conductor substance within said chamber formed by said hollow, metal, closed caps and said bushing in an amount which does not make contact with both caps when the switch is in one position, but which makes contact between said caps when the switch is in another position.

4. An article of manufacture as defined in claim 3; wherein
   (a) each hollow, metal cap has screw threads formed therein for a portion of the length thereof, and
   (b) said insulation bushing having the end portions thereof screw threaded to complementally receive the screw threaded portion of the respective hollow, metal caps.

References Cited by the Examiner

UNITED STATES PATENTS

| | | | |
|---|---|---|---|
| 1,861,800 | 6/1932 | Janisch | 200—61.47 |
| 2,099,483 | 11/1937 | Hinde | 200—61.47 |
| 2,290,124 | 7/1942 | Colby | 200—61.47 |
| 3,034,097 | 5/1962 | English et al. | 340—65 |
| 3,074,049 | 1/1963 | Saliba et al. | 340—65 |

BERNARD A. GILHEANY, *Primary Examiner.*

B. DOBECK, *Assistant Examiner.*